Patented July 22, 1947

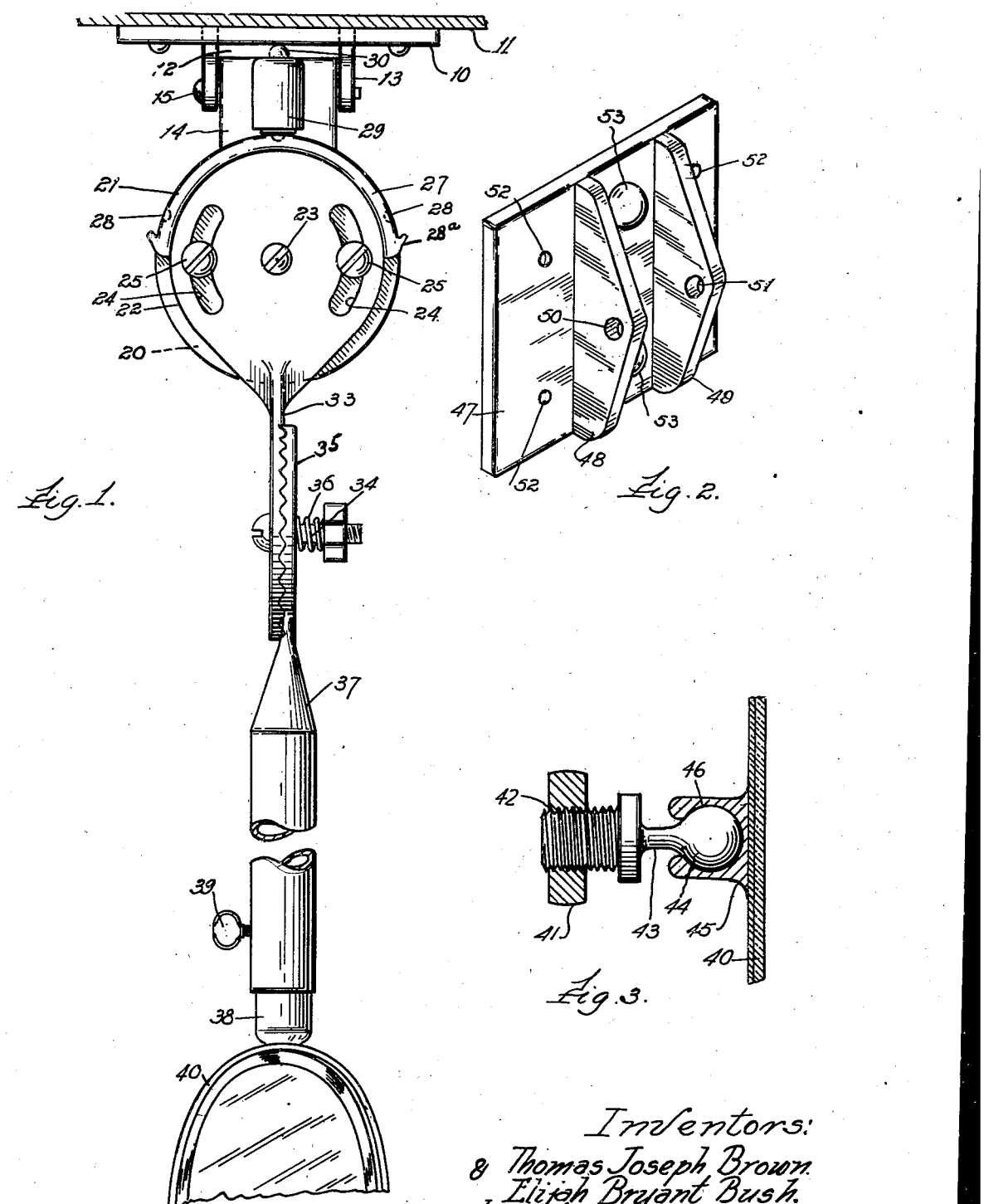

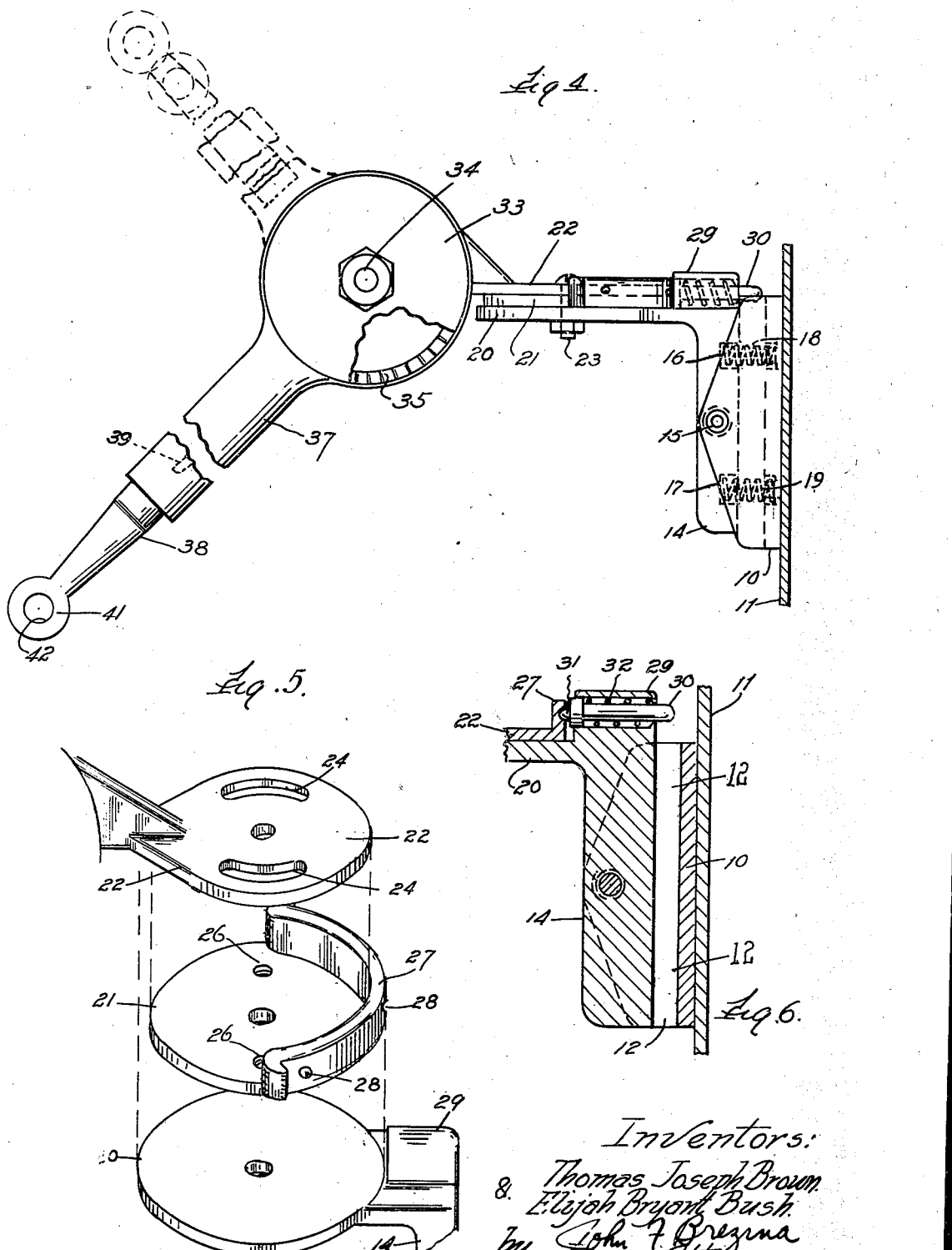

2,424,222

UNITED STATES PATENT OFFICE 2,424,222

REAR-VISION MIRROR MOUNTING

Thomas Joseph Brown and Elijah Bryant Bush, Oklahoma City, Okla.

Application March 28, 1945, Serial No. 585,248

9 Claims. (Cl. 248—278)

The present invention relates to a rear vision mirror supporting device for application to automotive vehicles to afford universal swinging movement of the mirror with respect to the connection of the device to a vehicle so that the mirror may swing away from an encountered obstacle without damage, regardless of the direction of impact between the obstacle and mirror.

Rear vision mirror supports in use at the present time consist of an arm which is rigid throughout its length and which is securely affixed to the vehicle so that whenever the mirror encounters an obstacle either the mirror is broken or the arm bent thus making the structure incompatible for further use.

An object of the present invention is to provide a rear vision mirror support which is capable of allowing the mirror to swing away from its adjusted position should it encounter an obstacle.

Another object of the present invention is to provide a rear vision mirror support which is readily adjustable angularly, vertically and horizontally so as to adjust the mirror in the position most convenient for the vehicle driver.

A further object of the present invention is to provide a rear vision mirror support having hinging parts swingable on horizontal and vertical axes to enable the mirror to swing away from its adjusted position whenever it encounters an obstacle, to thus avoid damage to the mirror and device.

A still further object of the present invention is to provide a rear vision mirror support having hinged parts swingable on different axes, which parts are normally held in desired adjusted position by spring means, which means yield when the mirror strikes an obstacle allowing it to swing away from danger.

Another and further object of the present invention is to provide means for supporting a rear vision mirror which prevents the transmission of vehicle vibrations to the mirror.

The above, other and further objects of the present invention will be apparent from the following description and accompanying drawings.

An embodiment of the present invention is illustrated in the accompanying drawings and the views thereof are as follows:

Fig. 1 is a top plan view of the invention showing a fragmental portion of a mirror and with the device projecting substantially at right angles to the vehicle, and in dotted lines, one position when the device has been swung away after the mirror encounters an obstacle.

Fig. 2 is an isometric view of one form of attaching bracket.

Fig. 3 is a view, partially in section, showing means for pivotally mounting the mirror on the device.

Fig. 4 is a side elevational view of the device, showing in full lines one adjusted vertical position and in dotted lines another vertical position.

Fig. 5 is an exploded view of relatively swingable plates for adjusting the angular position of the mirror in a horizontal plane.

Fig. 6 is a fragmental vertical sectional view through the attaching bracket and the connected inner end of the attaching device.

The drawings will now be explained.

Referring to Fig. 1, an attaching bracket 10 is suitably fastened to a portion of a motor vehicle, indicated at 11, by bolts, rivets, or other suitable means.

As may be observed in Figs. 1, 5 and 6 the bracket 10 has two vertical flanges 12 and 13 parallel to each other and laterally spaced. A block 14 is entered between the flanges 12 and 13 and secured thereto by a bolt 15 which constitutes a horizontal pivot. The pivotal connection of the block 14 to the bracket 10 allows it to oscillate about the pivot 15. The rear face of the block 14 is formed with two bores 16 and 17 one above and the other below the pivot 15. A spring 18 is entered in the bore 16 and bears against the adjacent surface of the bracket 10. A similar spring 19 is entered in the bore 17 and bears against the bracket 10. The tension of these springs is sufficient to maintain the block 14 and the balance of the attaching device in floating relation with respect to the bracket 10 and serves in absorbing vehicle vibrations thus preventing transmission of the vibrations to the mirror.

The block 14 has an outstanding ledge 20 which supports on its upper surface two circular plates 21 and 22, the plate 22 being on top of plate 21. A pivot pin or bolt 23 pivotally connects the plates 21 and 22 to the ledge 20 so that these plates may swing about the pivot 23 in horizontal direction. The plate 22 has formed in it two arcuate slots 24 to receive bolts 25 passing through the slots and threaded into apertures 26 in the lower plate 21. This arrangement permits angular adjustment of the plate 22 with respect to the plate 21 within the limits of the length of the slots 24. The lower plate 21 has an upstanding annular flange 27 extending partway along the periphery of the plate. This flange 27 has formed in its convex surface a plurality of dents or recesses 28 in spaced relation one to another, and also carrying integral stop projections 28a.

Formed as an integral part of the block 14 is a housing 29 which receives a plunger or detent 30 having a pointed end 31 which enters any one of the dents 28 in the flange 27 whenever the plunger and dent are in alignment. The plunger is actuated by a spring 32 which urges it to the left as viewed in Fig. 6 to maintain it in engagement with one of the dents 28 in the flange 27 and thus normally retain the plate 21 in angular adjusted position with respect to the block 14.

Secured to the upper plate 22 is a vertical plate 33 having a central opening to receive a pivot bolt 34. Also pivoted on the bolt 34 is another plate 35. The plates 33 and 35 have corrugation or teeth in their confronting surfaces to interlock or mesh. The confronting surfaces of the plates 33 and 35 are normally maintained in mesh by a spring 36 on the pivot 34, which forces the two plates together thereby normally holding these plates in predetermined angular adjustment about the horizontal pivot 34.

The plate 35 carries an elongated arm 37 which is hollow for a portion of its length to receive a rod 38. The rod is endwise adjustable in the arm 37 and is secured in endwise adjustment with respect to the arm by means of a bolt 39 which is threaded into the arm and bears on its inner end against the rod.

A mirror 40 is swingably mounted on the end of the rod 38. The extremity of the rod 38 has an enlarged end 41 having a threaded hole 42 in it. A bolt 43 is threaded in the hole 42 and has a spherical head 44 which is received in a block 45 on the back of the mirror 40, the block 45 having a spherical shaped recess 46 to receive the head of the bolt. Means well understood are provided to afford frictional engagement between the block 45 and the head 44 of the bolt to normally hold the mirror 40 in angular adjusted position on the end of the rod 38.

Fig. 2 illustrates another form of attaching bracket which includes a base 47 having parallel flanges 48 and 49 which flanges are apertured at 50 and 51 to receive a horizontal pivot for connecting the block 14 to the bracket. The base is provided with holes 52 through which rivets or bolts may pass to fasten the bracket to a suitable part of the vehicle.

The bracket 10 of Fig. 1 is illustrated as comprising a part of the door hinge of the vehicle. Where it is unhandy to attach the device to the door hinge a bracket as shown in Fig. 2 may be utilized.

Because of the provision of the vertical and horizontal pivots 23 and 34 the mirror and the device may be adjusted horizontally and vertically to position the mirror in a manner which is convenient for the vehicle driver. By reason of the pivotal mounting of the mirror on the end of the rod 38 the mirror may be angularly adjusted to afford maximum rear vision.

It is to be understood that to be effective as a rear vision mirror support the device must be long enough so that the mirror projects beyond the side surface of the vehicle to which the device is attached, thus subjecting the mirror to impact by obstacles encountered in traffic or in driving the vehicle through narrow spaces or in passing other vehicles on narrow highways.

Referring to Fig. 4 the full line position of the parts shows the mirror positioned below the attaching bracket. Should this mirror strike an obstacle, and the impact is upwards, the mirror would be swung to the dotted line position of this figure or even beyond it. Should the impact by any obstacle, be in a substantially horizontal direction, then the mirror and the attaching bracket would be swung without breaking the mirror or its supporting means.

The effectiveness of the springs 32 and 36 is such as will under normal conditions of operation maintain the plunger 30 in engagement with a dent in the flange of the plate 21 and the intermeshing corrugation of the plates 33 and 35 in engagement. These springs yield on impact against the mirror to allow the device to swing away from the normal adjusted position of the mirror so that the mirror may be moved away from danger without damage to the mirror or any part of the attaching device.

The attaching means of Fig. 2 shows two rubber knobs 53 as the resilient means for absorbing vibrations of the vehicle.

The invention has been described herein more or less precisely as to details, and it is to be understood that the invention is not limited thereby as changes may be made in the arrangement and proportions of parts, and equivalents may be substituted, without departing from the spirit and scope of the invention.

We claim:

1. A mounting device for a rear vision mirror including an attaching bracket, a block pivoted to said bracket to oscillate on a horizontal axis, resilient means between said bracket and said block to substantially prevent transmission of vehicle vibrations to said block, an arm carried by said block and supporting a mirror on its outer end, said arm having one portion pivoted to swing on a horizontal axis and having another portion pivoted to swing on a vertical axis, resilient means connected to said block and normally effective at said pivots to hold the mirror and said arm in predetermined adjusted vertical and horizontal positions, said resilient means being yieldable to permit the swinging of the mirror vertically and horizontally away from adjusted position should it encounter an obstacle, thereby preventing damage.

2. A device for supporting a rear vision mirror on a vehicle, including an attaching bracket, a block carried by said bracket, an outwardly extending arm, a pivot connecting said arm and said bracket adapted to permit swinging of said arm forwardly or rearwardly, said arm supporting a mirror at its outer end, means for adjusting said arm in a horizontal plane with respect to the bracket and other means for adjusting said arm in a vertical plane.

3. In a device of the class described, an attaching bracket, a block pivoted to said bracket to oscillate on a horizontal axis, resilient means between said bracket and block above and below the pivot to absorb any vibrations transmitted to the bracket.

4. In a device of the class described, in combination, an attaching bracket, a block pivoted to said bracket on a horizontal axis, said block having a horizontal ledge, two plates pivoted to said ledge, one above the other, to swing in a horizontal plane about a vertical pivot; a spring press plunger on said block acting against one of said plates to normally hold it in angular adjustment on said ledge; said plates having cooperating means to secure them together in relative angular adjustment; an arm carried by the upper plate and supporting a mirror on its outer end; said arm having a resilient construction pivotally connected between said upper plate and its outer end to permit vertical adjustment of the mirror with respect to said block.

5. In a device of the class described, in combination, an attaching bracket, a block having vertical and horizontal portions, the vertical portion being hinged to said bracket, resilient means between said bracket and said vertical part to absorb vibrations from the vehicle, two plates coaxially pivoted to said horizontal portion to oscillate about a vertical pivot, the upper of said plates having arcuate slots in it, bolts passing through said slots and threaded into the lower plate to secure said plates together in predetermined relative angular relation, said lower plate having a peripheral flange with dents in its convex surface, a spring pressed plunger in said block with one end enterable into any of said dents to normally maintain said plates in desired angular position with respect to said block, and an arm supported by the upper of said plates and having a hinge in its length movable on a horizontal axis, spring means for normally holding said hinge in predetermined position.

6. A device as described in claim 5 characterized by the fact that the plunger becomes disengaged from its depression to allow the arm to swing horizontally about the plate pivot when the arm encounters an obstacle setting up substantially horizontal force against said arm.

7. A device as recited in claim 5 characterized by the fact that the hinge spring means yields to permit the arm to swing vertically when the arm encounters an obstacle setting up vertical force against the arm.

8. Mounting means for a rear vision motor vehicle mirror comprising an attaching bracket; a block pivotally mounted on said bracket; resilient means acting against said block to normally maintain it in floating relation with respect to the bracket; swingable superposed plates coaxially pivoted to said block, said plates having means for limiting the pivotal movement thereof; a vertical extending plate secured to the upper of said plates and having a corrugated surface; a second vertical plate pivoted to said first vertical plate and having a corrugated face engaging said first vertical plate; spring means acting to normally maintain the corrugated faces of said vertical plates in engagement; an arm carried by said second vertical plate; a rod extensibly connected to said arm; a mirror carried by the outer end of said rod; a spring pressed plunger on said block acting against one of said first mentioned plates and adapted to hold said plate and said arm in desired position with respect to said block, said plunger being adapted to yield upon impact upon said mirror or rod to permit horizontal swing of the arm, rod and mirror, said engaging corrugated faces of said vertical plates being adapted to yield to upward or downward impact on said mirror, rod or arm to permit vertical movement of said mirror, rod and arm.

9. In a device of the class described, in combination; an attaching bracket; a block pivoted to said bracket; two superposed horizontal plates pivoted to said bracket; a spring pressed plunger on said block acting against one of said plates to normally hold it in desired angular adjustment; said plates having cooperating means to adjustably secure them together; a vertical plate member secured to one of the said horizontal plates; a second vertical plate pivoted to said first vertical plate; a spring adjacent said vertical plates adapted to normally maintain said vertical plates in frictional engagement; an arm on said second vertical plate; a mirror adjustably connected to said arm, the striking of said mirror or arm upwardly, downwardly, rearwardly or forwardly being adapted to permit yielding movement of said mirror and said arm in directions opposite to the striking force.

THOMAS JOSEPH BROWN.
ELIJAH BRYANT BUSH.

REFERENCES CITED

The following references are of record in the file of this patent:

UNITED STATES PATENTS

| Number | Name | Date |
|---|---|---|
| 1,275,311 | Schumacher et al. | Aug. 13, 1918 |
| 1,921,310 | Crisman | Aug. 8, 1933 |
| 2,035,411 | Udell | Mar. 24, 1936 |
| 2,047,325 | Jones | July 14, 1936 |
| 2,143,281 | Sauer | Jan. 10, 1939 |